United States Patent Office 3,002,358
Patented Oct. 3, 1961

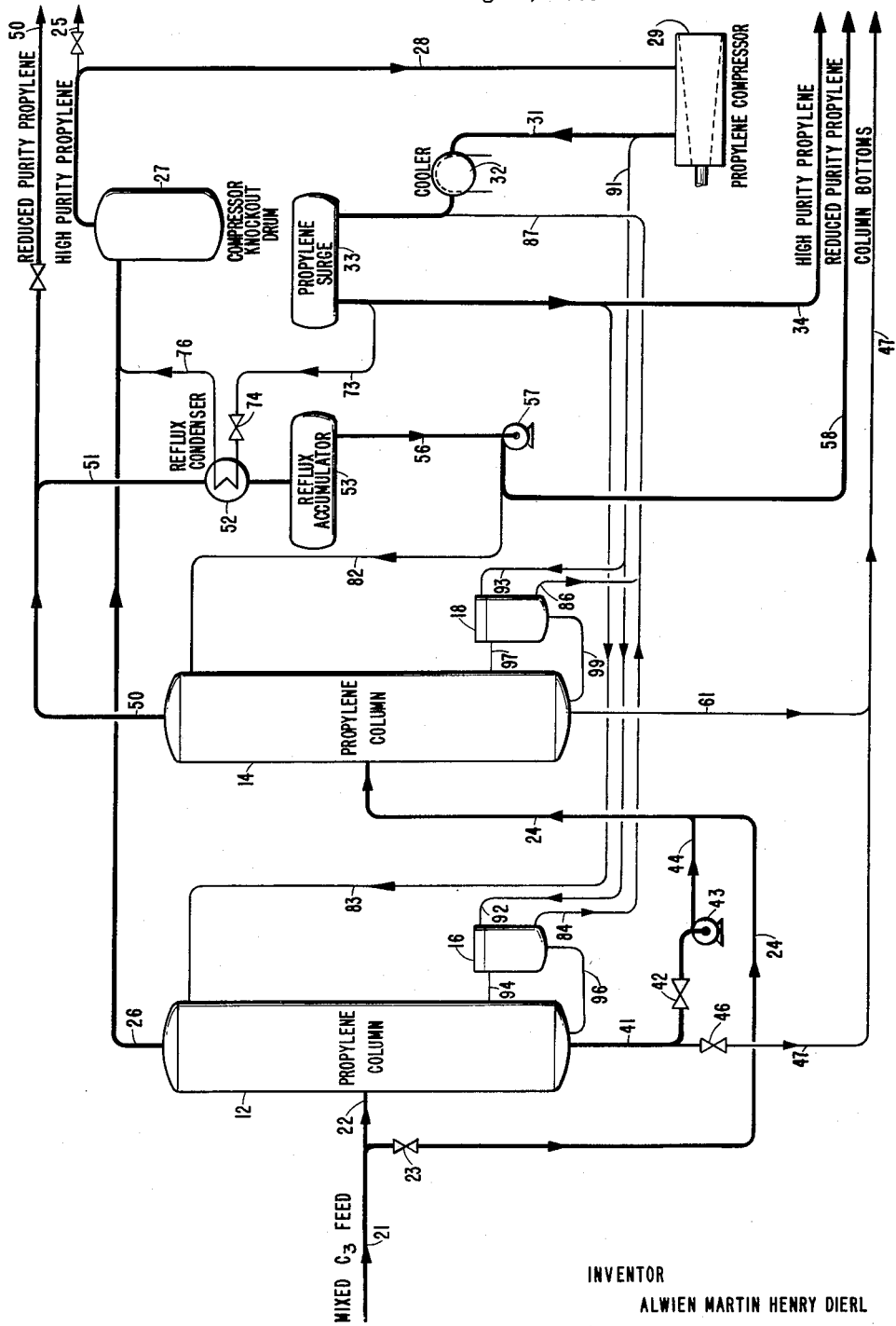

3,002,358
PROPYLENE DISTILLATION
Alwien M. H. Dierl, New York, N.Y., assignor to Shell Oil Company, New York, N.Y., a corporation of Delaware
Filed Aug. 1, 1960, Ser. No. 46,449
5 Claims. (Cl. 62—23)

This invention relates to the separation of propylene from a mixed feed of $C_3$ hydrocarbons and more particularly to the production of propylene in more than one degree of purity through an improved system of fractional distillation coupled with propylene refrigeration.

The separation of propylene from propane and other $C_3$ hydrocarbon feeds is at best an expensive refinery operation. The maintenance of elevated pressures along with the requirement for particular apparatus to withstand such pressures contributes to the problem. Moreover, refinery streams which are eventually supplied to various facilities engaged in the manufacture of petrochemicals, an important outlet for the valuable propylene, have in the past been limited to single purity propylene product. However, as it often occurs, more than one independent petrochemical process will require propylene feed and, in certain instances, the requisite degree of propylene purity will vary with the particular process to which it is supplied. Because of this there arises a further problem of diluting the propylene with inert materials or even of concentrating the propylene to increase its purity to desired minima. For example, in the manufacture of allyl chloride, the propylene feed to the reaction must, of necessity, be of a high degree of purity, say about 98 percent minimum propylene content. This is dictated in such instance by chlorine usage and by recycle rates. On the other hand, in the manufacture of acrolein or acrylonitrile, the purity of propylene feed to the reation may be substantially reduced, for example, to around 90% m propylene. In fact, depending on the catalyst used in the production of acrolein, propylene with purity as low as that found in refinery catalytically cracked streams may often be used to advantage. Hence, it is readily apparent that the propylene streams supplied to each of the foregoing petrochemical reactions can, and in fact, should vary over rather wide ranges of product purity. As a consequence thereof, the desirability of producing simultaneously and as an integrated process streams of more than a single limited product purity is immediately seen, with each stream of its own particular purity being fed into an appropriate reaction therefor.

The present invention therefore embodies means for the simultaneous production of propylene product in streams having more than one product purity. Moreover, the invention provides as an integrated process a system of simultaneous distillation of propylene in at least two zones or columns, one of which is operated at lower pressures than the other with a higher purity propylene product resulting therefrom, with refrigeration being supplied by means of a compession-expansion refrigeration train from propylene overhead product stream.

The process of this invention is particularly advantageous when the top temperatures of the two distillation zones (in series or in parallel) are below available process cooling water ambient temperature yet the overhead from the higher purity product distillation is readily compression-heatable to a temperature above cooling-water temperature and after removal of at least a part of the heat of compression by cooling water it can be cooled by expansion, to about the same pressure as before, to a temperature sufficiently lower than the top temperature of the lower purity product distillation zone to provide reflux refrigeration therefor by indirect heat exchange.

The invention may be more readily understood from a consideration of the following detailed description thereof taken in conjunction with the accompanying drawing which is a simplified flow diagram of one preferred embodiment of a process for converting a mixed $C_3$ hydrocarbon stream into, for example, two propylene product streams, each being of different propylene purity from the other.

In propylene distillation for its recovery from a $C_3$ feed stream, the production of high purity overhead propylene product is an inverse function of the pressure maintained in the fractionating column. In other words, the alpha value, representing in this instance the relative volatility of the propylene to propane from which it is to be separated, increases as the pressure on the system is reduced. In general the separation of $C_3$ hydrocarbons by distillation is carried out at superatmospheric pressures. Now, the present invention provides a process of operating at appropriate pressures to assure two different products of desired propylene purity using an integrated system of at least two different distillations and providing its own refrigeration as reflux therefor as an important feature of the self-contained process.

In further consideration of the relationship of alpha value to pressure in a $C_3$ mixture and its bearing on propylene separation from $C_3$ streams, it is significant that the lack of ideality of the system reduces the alpha value as the propylene concentration increases and, as a result of this phenomenon, certain difficulties are usually encountered in the manufacture of high quality propylene by means of the conventional single-column distillation techniques. For example, in producing propylene of 98% m purity only a 60 to 70 percent recovery can be economically attained and this at a lower production rate than in producing 90% m purity propylene from the same column wherein a recovery of say 90 percent can be had in considerably less elapsed distillation time.

It is an important consideration in all refinery operations to provide the most economical means for cooling and refrigeration. As often as is possible, cold water is obviously used to great advantage. However, in operations requiring cooling of columns to provide reflux when the overhead temperatures are in the range of say 60 to 90° F., and particularly in temperate climates, the relative volumes of cooling water required will often be economically prohibitive and the effectiveness of such cooling will be in considerable doubt. Hence, other cooling or refrigeration to an extent at least below ambient temperatures must be provided. The present invention provides propylene refrigeration in the system by means of a heat-pump condensation and expansion train in the propylene line. In accordance with the invention reflux is provided to the column from which the propylene initially is produced as overhead product by means of side stream cooling, and the same refrigeration means provides reflux to a still further column also involved in the separation of propylene product from the $C_3$ feed but in a different degree of purity.

Moreover, the type of heat-pump compressor employed is of considerable importance. It has been found desirable to use a centrifugal compressor in preference to one of the reciprocating type for several significant reasons. First, the installed cost of the centrifugal compressor is less and secondly the stream factor attainable is considerably higher. Also, the cost of instrumentation is an item to be evaluated. Centrifugal compressors are not normally available in sizes below about 500 to 600 ACFM discharge. Furthermore, in commercial size ranges, the installed capital cost per horsepower decreases appreciably as the size of the compressor increases. Such factors as the foregoing indicate the desirability of integrating process streams as much as possible in order to maximize the appropriate size of the heat-pump compressor.

Referring now in detail to the sole figure of the specification high purity, reduced pressure propylene fractionation column 12 and reduced purity elevated pressure propylene column 14 are provided with reboilers 16 and 18, respectively, with conventional and appropriate assemblies, described hereinafter, connected therewith. Main feed line 21 is appropriately connected with the column 12 by line 22 extending the line 21 thereto and is also connected through valve 23 and line 24 in similar manner with the column 14. Line 26 connects the overhead from the column 12 with compressor knock-out drum 27 which is in turn connected by line 28, provided with high purity propylene product draw-off line 25, to propylene compressor 29. Line 31 leads from the propylene compressor 29 through water cooler 32 into propylene surge tank 33. Line 34 delivers high purity propylene product from the surge tank 33.

Bottom line 41 from the propylene column 12 leads alternately, either through valve 42 and pump 43 via line 44 into the line 24, or through valve 46 into column bottoms line 47. Line 51, provided with reduced purity propylene product draw-off line 50, connects the overhead from the column 14 through reflux condenser 52 to reflux accumulator 53. Line 56 connects the reflux accumulator 53 via pump 57 into reduced purity propylene product line 58. Bottoms line 61 leads from the column 14 into the column bottoms line 47. Line 73 is connected from the line 34 through the reflux condenser 52 and line 76 into the line 26. Reflux line 82 connects the line 58 with the upper portion of the column 14; and reflux line 83 connects the line 34 with the upper portion of the column 12. The reboilers 16 and 18 are connected by lines 92 and 93, respectively, via line 91 into the line 31. Line 87 connects the line 31 downstream of cooler 32 with the reboilers 16 and 18 via lines 84 and 86, respectively. Lines 94 and 96 connect the reboiler 16 in appropriate manner with the column 12 whereas lines 97 and 99 connect the reboiler 18 similarly with the column 14.

As an example illustrating a preferred embodiment of the invention, a mixed $C_3$ hydrocarbon feed containing 68% m propylene and at a flow rate of 3470 barrels of propylene per stream day (b./s.d.) is introduced into line 21 with valve 23 being open so that the flow rate to column 12 is 1130 b./s.d. and to column 14 is 2340 b./s.d. The bottoms temperature and pressure of column 12 are 90° F. and 165 p.s.i.g. and the upper temperature and pressure of this column are 75° F. and 155 p.s.i.g., whereas the bottoms temperature and pressure of column 14 are 105° F. and 190 p.s.i.g. and the upper temperature and pressure are 90° F. and 180 p.s.i.g. Propylene of 98% m purity is taken overhead from column 12 through line 26 into knock-out drum 27 operated at 75° F. and 153 p.s.i.g. thence through propylene compressor 29 functioning at the rate of 4500 ACFM at suction conditions. The compressed propylene in line 31 is at 142° F. and 270 p.s.i.g. and is passed through water cooler 32 with cooling-water temperature of about 95° F. into propylene surge tank 33 which is under the conditions of 110° F. and 260 p.s.i.g. The 98% m propylene product in line 34 is available at the rate of 680 b./s.d., with 450 b./s.d. propylene leaving column 12 as bottoms product through line 41, valve 46 (valve 42 being closed) and line 47 for further processing.

The overhead from column 14 is of a purity of 90% m propylene and is led through reflux condenser 52, where it is partially condensed by heat exchange against expansion cooled (through expansion valve or engine 74) high purity product, into reflux accumulator 53 operating at 90° F. and 175 p.s.i.g. This propylene of reduced purity is transported via line 56 through pump 57 and is available from product line 58 at a flow rate of 2100 b./s.d. of 90% m propylene, with 240 b./s.d. propylene leaving column 14 as bottoms product through line 61 and line 47 for further processing. In this particular instance and under the conditions set forth the recovery of propylene from column 12 is 60 percent of the feed and from column 14 is 90 percent of the feed, with an overall recovery of 80 percent.

As will be readily understood, only a portion of the overhead from column 14 need be routed through the reflux condenser, i.e., the amount required for reflux. The remainder may be withdrawn through line 50.

As a still further and alternate embodiment of the invention, valve 23 may be maintained in closed position and the entire mixed $C_3$ hydrocarbon feed be introduced into column 12, in lieu of directly introducing the split stream into each of columns 12 and 14 simultaneously. The bottoms from column 12 are then passed through line 41 and valve 42 (valve 46 remaining closed) into pump 43 thence through lines 44 and 24 into column 14. By feeding the bottoms from the high-purity, low-recovery column 12 into the reduced-purity, high-recovery column 14, there will be a further increase in the effective recovery, i.e., a decrease in the quantity of the $C_3$ required. However, because of limitations of column capacity, it will be immediately apparent that the propylene production from this particular embodiment of the invention will be somewhat less than from that set forth in the foregoing example.

It is to be particularly noted that the overhead from the reduced-purity column 14 is condensed in reflux condenser 52 by propylene refrigeration supplied by means of line 73 from line 34 emerging from propylene surge tank 33. Such refrigeration is one of the desirable and advantageous features of the invention in that an integral column reflux and product is provided. This propylene refrigeration is attained by passing the product from the high purity column 12 into the suction of the heat-pump compressor 29. In order to achieve the heat transfer between tops of the two columns, it is a requisite that the reduced-purity column 14 operate at a higher pressure than the high-purity column 12. The reduced-purity column is advantageously operated at the higher pressure because of the effect of pressures and alpha values discussed hereinbefore.

I claim as my invention:

1. Process for the production of two propylene products of different propylene purities from a mixed propylene/propane feed stream comprising the steps of introducing mixed propylene/propane feed into a high purity propylene product distillation zone and into a low purity propylene product distillation zone, respectively, the pressure and temperature in said high purity zone being lower than the pressure and temperature in said low purity zone, separating by distillation in each of said zones an overhead vapor product and a bottoms material, passing at least a portion of said overhead product from one of said zones through a compression-heating, indirect cooling and expansion train and thereby producing a propylene stream having a lower temperature than the overhead from the other of said zones and using at least a portion of said lower temperature propylene stream as indirect refrigeration for reflux for the propylene distillation in said other zone.

2. Process for the production of two propylene products of different propylene purities from a mixed propylene/propane feed stream comprising the steps of introducing mixed propylene/propane feed into a high purity propylene product first distillation zone and into a reduced purity propylene product second distillation zone, respectively, the pressure and temperature in said high purity zone being lower than the pressure and temperature in said low purity zone, separating by distillation in each of said zones an overhead vapor product and a bottoms material, passing from said first zone at least a portion of the overhead product as a high purity propylene stream through a compression-heating, indirect cooling and expansion train and thereby producing a high purity propylene stream having a lower temperature than the overhead from the reduced purity distillation zone and using at least a portion of said lower temperature propylene stream as indirect refrigeration for reflux for the reduced purity propylene distillation.

3. Process in accordance with claim 1 wherein a still further portion of the lower temperature propylene stream is used for reflux for the distillation zone from which it originated as overhead product.

4. Process in accordance with claim 1 wherein the bottoms material from the high purity propylene product distillation zone is introduced as feed stream into the reduced purity propylene product distillation zone.

5. Process in accordance with claim 1 wherein at least one of said overhead vapor products is withdrawn as a product stream.

References Cited in the file of this patent
UNITED STATES PATENTS

| | | |
|---|---|---|
| 1,212,455 | Claude | Jan. 16, 1917 |
| 1,853,743 | Pollitzer | Apr. 12, 1932 |
| 2,567,461 | Archer | Sept. 11, 1951 |